United States Patent

Bloss

[11] Patent Number: 6,099,810
[45] Date of Patent: Aug. 8, 2000

[54] DEVICE FOR TREATING FLAT SUBSTRATES BY A CORONA STATION

[75] Inventor: Fritz Bloss, Mönsheim, Germany

[73] Assignee: Arcotec Oberflachentechnik GmbH, Germany

[21] Appl. No.: 09/051,597

[22] PCT Filed: Aug. 31, 1996

[86] PCT No.: PCT/EP96/03833

§ 371 Date: Sep. 15, 1998

§ 102(e) Date: Sep. 15, 1998

[87] PCT Pub. No.: WO97/14546

PCT Pub. Date: Apr. 24, 1997

[30] Foreign Application Priority Data

Oct. 13, 1995 [DE] Germany ............ 195 38 176

[51] Int. Cl.[7] .................. B01J 19/08; B01J 19/12
[52] U.S. Cl. .................. 422/186.05; 422/186.04; 422/186.1; 422/186.21
[58] Field of Search ............ 422/186.04, 186.05, 422/186.1, 186.21, 186.23, 186.13, 186.26; 427/569

[56] References Cited

U.S. PATENT DOCUMENTS

| 4,774,061 | 9/1988 | Ahlbrandt ............ 422/186.05 |
| 4,946,568 | 8/1990 | Kalwar et al. ............ 204/164 |
| 5,224,441 | 7/1993 | Felts et al. ............ 118/718 |
| 5,576,076 | 11/1996 | Slootman et al. ............ 427/579 |

FOREIGN PATENT DOCUMENTS

| 4212549 C1 | 2/1993 | Germany. |
| 6019246 | 1/1994 | Japan. |
| 1045087 | 10/1966 | United Kingdom. |

OTHER PUBLICATIONS

English Abstract of JP6019246, Jan. 1994.

Primary Examiner—Kathryn Gorgos
Assistant Examiner—Wesley A. Nicolas

[57] ABSTRACT

The invention relates to an apparatus for processing flat substrates by means of a corona station, comprising at least one electrode which can be connected to a high-voltage supply via connecting means, a housing device which at least partly accommodates the electrode and its connecting means, at least one counter-electrode, at least one device having at least one feed unit and at least one extraction unit for producing a gas flow which essentially has a directional component for the counter-electrode, and in which apparatus the flat substrate can be led along between the electrode and the counter-electrode, the counter-electrode being of roller-shape construction and the flat substrate bearing against the counter-electrode and being deflected from a feed direction into a direction deviating from the feed direction and being led away, and at least one extraction unit which can be adjusted from the paths of the web of the flat substrate being provided.

24 Claims, 4 Drawing Sheets

DEVICE FOR TREATING FLAT SUBSTRATES BY A CORONA STATION

Apparatuses for single-sided or else double-sided processing of flat substrates, for example endless films or sheet ware made from plastic, paper, metal etc., frequently comprise corona stations.

Corona stations for processing these substrates comprise at least one electrode connected to a high-voltage supply, and at least one counter-electrode, which is generally earthed. For the most part, a plurality of electrodes and one counter-electrode are used. The substrate to be processed is led along between the electrodes connected to the high-voltage supply and the earthed counter-electrode, the substrate generally being against the counter-electrode. The substrate is thus situated in the spark gap.

The electrodes (in what follows, "electrode" is always understood as the electrode connected to the high voltage), the flow-carrying cables of the electrodes, and the insulators are essentially surrounded by a housing device in order to protect the operating staff against the high voltage and also to prevent damage to the electrodes, cables and insulators. The housing devices are frequently essentially cuboidal chambers, it being the case that the electrodes are located on the one side of the chamber, and the connection for the high-voltage supply is located on a neighbouring or on the opposite side of the electrodes.

During the corona discharge, the electrodes become hot, with the result that the corona stations generally comprise devices for producing gas flows which ensure that air or another gas mixture is led along the electrodes. These devices likewise have the purpose of removing the ozone produced by the corona discharge from the ambient air. These devices are extraction units which are connected to the chamber. They are used to suck air or another gas mixture into the space in which the corona discharge occurs, past the electrodes through the chamber to the extraction opening, as a result of which the electrodes are cooled and the ozone produced during the corona discharge as well as other constituents possibly present in the air are extracted.

In these known apparatuses, defects such as short circuiting, burning or destruction of the insulators occur sooner or later in the corona station. These defects occur in a period of from a few months up to two years after installation, depending on the electric loading and dirt loading. They are to be ascribed essentially to the fact that dirt, solvents, dust, fibres, adhesive remnants etc. are transported into the chamber, where they are deposited in part and destroy the electrodes, connecting means, insulators etc. These defects lead to substantial production losses, since then, for example, the entire printing machine lines come to a standstill.

Since the essential portion of the contamination stems from the substrate, the "web", to be processed, special web cleaning units are connected upstream, in order to prevent the effects of contamination and the defects occurring thereby. Despite the use of these additional cleaning units, which do, after all, also cause the dust particles are so strongly charged that they are easily detached from the material web and extracted. Air suction channels are provided for this purpose to the left and right of the spray electrodes, in order to extract the detached particles from the material web. Owing to the floating guidance of the material web between the spray electrodes and to the simultaneously acting air flows, uniform detachment and extraction of the dirt particles from the material web cannot be guaranteed, because of fluctuations of the material web in its course.

DE 42 12 549 C1 has disclosed an apparatus for electrically pretreating flat substrates, which has a corona station. A plurality of electrodes which are situated opposite a counter-electrode are arranged in a housing. The housing has an inner housing with a nozzle arrangement which accommodates the electrodes. Via this inner housing, a gas is fed onto the film past the electrode arrangement and extracted again by an extraction unit. The extraction unit is constructed by a channel, which is provided to the right and left of the nozzle arrangement and is part of the housing. The housing shape pointing towards the counter-electrode is adapted to the diameter of the counter-electrode and constructed in a rigid fashion. As a result, this corona station can be operated exclusively with a counter-electrode adapted to the housing shape.

It is the object of the invention to provide an apparatus which makes flexible use possible and ensures reliable detachment and extraction of the dirt particles from the material web.

It is the object of the invention to provide an apparatus of the generic type in which the above-described defects can be prevented by simple means, at least partly.

This object is achieved by an apparatus for processing flat substrates by means of a corona station, comprising: at least one electrode which can be connected to a high-voltage supply via connecting means, a housing device which at least partly accommodates the electrode and its connecting means, at least one counter-electrode of cylindrical shaped construction, and at least one device having at least one feed unit and two extraction units for producing a gas flow which essentially has a directional component for the counter-electrode, the flat substrate bearing against the counter-electrode and being deflected from a feed direction into a direction deviating from the feed direction and being led away. In each case at least one extraction unit is provided on the inlet side of the substrate into a corona space formed between the electrode and counter-electrode, and on the outlet side of the substrate from the corona space, and in that the extraction units can be adjusted onto the path of the web of the substrate.

In the apparatus, clean air, or else another gas or gas mixture, flows from the interior of the housing device past the electrode to be cooled, doing so initially in the direction of the counter-electrode, and is then led away outwards, in the space in which the corona discharge occurs (corona space), via the extraction unit, with the result that the parts located in the housing device are no longer contaminated by the dirt extracted from the substrate to be processed, and the electrodes to be cooled are no longer flowed around by dirt-laden air or another dirt-laden gas mixture. As a result of this, a high degree of purity and effective ozone extraction can be provided.

Favourable flow conditions can be provided by the extraction unit, which can be adjusted to a course of the web of the substrate. An air flow beating the flat substrate is deflected to the side and can flow into the extraction unit in a direct rectilinear incoming flow. This largely excludes vortices, with the result that even the entrained particles and/or the extracted dirt can be extracted with a high efficiency, without said dirt being deposited on adjacent parts, something which could be caused by vortices.

For the purpose of simplification, it is laid down for the following description that air is additionally also to be understood as a gas, in particular an inert gas such as nitrogen, helium etc., but also a mixture of gases.

The result of the development in which at least one inlet opening of the extraction unit is essentially arranged to the side of the space in which the corona discharges occur is that the gas flow is extracted from the corona space at the side. The at least one inlet opening of the extraction unit, and the longitudinal axis of the electrode should be aligned essentially parallel to one another in this arrangement. The gas flow thus flows past the electrode firstly essentially in the direction of the counter-electrode, and then essentially in the direction of the at least one inlet opening of the extraction unit. Since the air flows through the corona space, the gases and particles forming contaminants are borne away and extracted through the at least one inlet opening. However, it also possible to arrange the inlet opening of the extraction units above and/or below the corona space, that is to say essentially perpendicular to the longitudinal axis of the electrode. Of course, an apparatus can also comprise a plurality of extraction units, which can be arranged at the side of and/or above and/or below the corona space.

Moreover, owing to the underpressure produced by the inlet opening of the extraction unit, the dirt which is located on the flat substrate is entrained by the gas flow and likewise extracted through the inlet opening. The result is that the substrate is cleaned without this requiring specific cost-intensive web-cleaning units.

Of course, the inlet opening of the suction unit must be arranged such that it does not suck the dirt past the electrodes in the direction of the connecting means located in the housing device. This is prevented by virtue of the fact that the inlet openings are located to the side of the corona space or to the side of the corona space shifted in the direction of the counter-electrode. Further advantageous refinements of the inlet opening of the extraction unit, which accomplish effective cooling of the electrode as well as effective extraction of ozone and dirt, follow from the feature that the inlet opening of the extraction unit is aligned essentially parallel to the longitudinal axis of the electrode, and the feature that the length of the inlet opening corresponds at least to the length of the electrode and/or the width of the substrate.

A particularly uniform and effective extraction over the longitudinal extent of the corona space can be achieved in accordance with the feature that the direction of inlet of the gas mixture into the inlet opening of the extraction unit and the direction of outlet of the gas mixture from the outlet opening of the extraction unit are essentially perpendicular to one another if the direction in which the gas or particle mixture flows into the inlet opening of the extraction unit and the direction in which the gas or particle mixture flows out again from the extraction unit are essentially perpendicular to one another. This has proved itself, in particular, in the case of extraction units whose inlet and outlet openings differ in their shade and extent, as is the case, for example, with an elongated inlet gap and a round outlet opening.

In order for it to be possible to adapt the effectiveness of the extraction and the adjustment of the inlet openings of the extraction unit to the thickness and the location of the substrate, the alignment and type of the electrode, the electrode/counter-electrode spacing, the dirt loading of the substrate, the ozone concentration etc., it has proved in accordance with the feature that the size and/or location of the inlet opening is at least partly adjustable to be advantageous that the size and/or the location of the inlet opening can be adjusted at least partly.

In accordance with the feature that two extraction units are provided which preferably are of identical mirror-image configuration, and the feature that the housing device has a feed unit for gases, air or gas mixtures, which feed unit has an inlet opening leading into the housing device, extraction units can be arranged on both sides of the corona space. The desired cooling of the electrodes and the extraction of dirt are achieved in the case of both arrangements. Particularly good results in relation to the ozone extraction are achieved with the extraction system located on the outlet side, since the laminar ozone-containing layer of air adhering to the substrate can be removed effectively here.

In accordance with the feature that the feed unit and/or the housing device has filter means, a strengthening of the suction effect is achieved by providing two extraction units, which, in accordance with the feature that the size of the feed opening is adjustable, are advantageously provided on the inlet side and the outlet side of the substrate from the corona space. If provision is made of two extraction units which are arranged on both sides of the corona space and whose inlet opening and location can be adjusted, the inlet opening can be optimized for ozone extraction on the outlet side of the substrate, and be adjusted for maximum extraction of dirt from the substrate surface on the inlet side of the substrate.

This particularly preferred embodiment of the two extraction units arranged on both sides achieves an outstanding extraction of ozone and dust, and a very effective cooling of the electrode(s).

In accordance with the feature that the feed unit comprises a device for producing a gas flow, a feed unit for gases, air or gas mixtures should be present at the housing device in order preferably to prevent the extraction unit from extracting the room air and the prevention of the desired cooling of the electrodes. The feed unit should have an inlet opening leading into the housing device, so that the desired flow can occur from the region of the connecting means of the electrode in the housing device in the direction of the electrode, and subsequently towards the extraction unit.

In order to prevent contaminants in the housing device, in accordance with the feature that the means for directing the gas flow are provided in the housing device, the feed unit and/or the housing device should be provided with filter means, in particular if the gas mixture used is the ambient air. The filter means can, for example, be made from paper, activated carbon or the like, and it should be possible to exchange them in a simple way. If the ambient air is led through the housing device, it suffices to use as feed unit a stub which, if appropriate, has the required filter means. In order to control the flow of the current, it is advantageous in accordance with the feature that the means for directing the gas flow are provided in the extraction unit to provide feed openings of adjustable size.

In accordance with the feature that the means for directing the gas flow are constructed as air-guiding baffles, a further refinement of the invention provides a device, at the feed unit, for producing a gas flow. The gas flow can, for example, be achieved by virtue of the fact that the gas pressure in the feed unit is higher, for example, than the gas pressure in the housing device in the region of the connecting means.

In order to prevent the air entering the housing device from taking the "direct path" from the inlet opening into the housing device to the inlet opening of the extraction unit, as a result of which the desired cooling of the electrode would be reduced, in accordance with the feature that the high voltage is at least 2 kV means for directing the gas flow are preferably provided in the housing device and have the effect that the electrode or the electrodes are all flowed around by the air flow in essentially uniform fashion, and are thus cooled.

Particularly preferred embodiments which unite the advantages of the extraction unit and the feed unit with one another follow from the feature that the minimum electrode/counter-electrode spacing is at most 5 mm, and the feature that it is explosion-protected.

The air flow can be controlled and directed in detail by means of the preferred embodiment in accordance with the feature that the gas flow forms a circuit, and the feature that filter means and/or a cooler are provided in the circuit. It is possible for this purpose to provide guiding baffles which lead a component air flow to each stream or to two or more electrodes arranged next to one another.

Preferred developments of the invention follow from the feature that at least two electrodes and one counter-electrode are provided, and the feature that the counter-electrode is rotatable. The minimum spacing measured between the surfaces of electrode and counter-electrode should be at most 5 mm, preferably approximately 2 mm.

It is likewise possible to provide the device in an explosion-protected design in accordance with the feature that the counter-electrode is essentially level on the side facing the electrodes.

In accordance with the feature that ionizers and/or brushes and/or extraction and/or blowing units are additionally provided, a further preferred refinement provides for the gas flow to form a circuit. This can be achieved by connecting the outlet opening of the suction unit to the inlet opening of the feed opening, for example by means of a gas line. Filter means and, if appropriate, a cooler should be provided in such a gas circuit. Filter means can be, for example, activated carbon, or else catalysts such as, for example, palladium-containing catalysts, which serve the purpose of adsorbing and/or decomposing the ozone formed, thus preventing the reactive ozone from being able to damage the connecting means of the electrodes, the insulation or the electrodes. Depending on the temperature of the electrodes, the number of electrodes, the gas volume used etc., it can likewise be advantageous to cool the gas mixture fed again in the circuit of the housing device, for example by means of a heat exchanger, in order to prevent a decrease in the effectiveness of the gas cooling of the electrodes with time as a result of the heating of the gas mixture.

In addition to being used for flat substrates, the apparatus can also be used for fibre-like substrates. In principle, all possible substrates can be used whose thickness is somewhat less than the spacing between the electrode or electrodes and the counter-electrode, so that they can be led between them. The substrate need not necessarily bear against the counter-electrode. It can also be led between electrode and counter-electrode without bearing against the counter-electrode and also without bearing against the hot electrode, of course.

The invention is not limited to the use of specific electrodes and counter-electrodes. It is possible to use both ceramic electrodes and metal electrodes as (counter-)electrodes. The (counter-)electrodes can be both cylindrical and cuboidal, or else of a different shape.

The apparatus can be equipped to form a combined corona/web-cleaning unit by means of additional ionizers and/or brushes and/or extraction and/or blowing units—for example on the inlet side of the substrate. Such a corona/web-cleaning unit has the inventive advantages and is, moreover, also more cost-effective by comparison with the known corona stations and web-cleaning systems.

Of course, the apparatus can also be equipped with other web-processing units, such as brushes and additional rollers, and also blowing units.

The apparatus can, of course, also be used for double-sided processing of the substrate.

It has emerged that better results in the processing of the substrate are also achieved by means of the device according to the invention with the novel way of guiding the air. This is to be ascribed to the fact that the reactive species such as ozone, which can be formed by the corona discharge in the corona space, flow along the substrate in the case of the novel way of guiding the air, and are not, as is the case with the known apparatuses, extracted by the substrate as it were immediately after being produced.

The direction of flow along the substrate and the hot electrode(s) additionally has the effect that the reactive species are decomposed.

A method is also specified which prevents damage to the substrate and the electrode or electrodes in the event of a reduction in the tension of the substrate web. If the tension with which the substrate is led along the counter-electrode reduces, for example when the apparatus is at a standstill, the substrate web is sucked against the hot electrode by the suction. If, in addition, the counter-electrode is arranged above the electrode, gravitation additionally reinforces this undesirable effect. Because of its frequently thermoplastic properties, the substrate adheres firmly to the hot electrode, it starts to fuse or is even decomposed on the electrode, as a result of which substrate and electrode are damaged. Carbonization of the electrode bars frequently occurs, resulting in considerable contamination.

Owing to the novel way of guiding the air, in the event of decreasing tension of the substrate the substrate webs are no longer sucked in the direction of the hot electrode, but against the counter-electrode or support roller, which is relatively cool, the result being to avoid the above damage.

BRIEF DESCRIPTION OF THE DRAWINGS

Further advantageous refinements and advantages of preferred exemplary embodiments follow from the description below with the aid of drawings, in which:

FIGS. 1 and 2 show different views of an apparatus 11 with five electrodes 12. The five electrodes 12 are connected to a high-voltage supply connection with the aid of connecting means 24, which are represented only in FIG. 1. The counter-electrode 13 (FIG. 2) is roller-shaped and mounted rotatably about the axis 14. The substrate 16 is transported along the electrodes 12 in the direction of the arrows 17, 18 by the rotary movement of the counter-electrode 13, against whose surface 19 it bears. The corona discharge 21 occurs between the electrodes 12 and the counter-electrode 13 in the corona space 22 (FIG. 3). The minimum spacing 54 between the surface 19 of the counter-electrode 13 and the surface 20 of the electrode 12 is approximately 2 mm.

Figure 1:
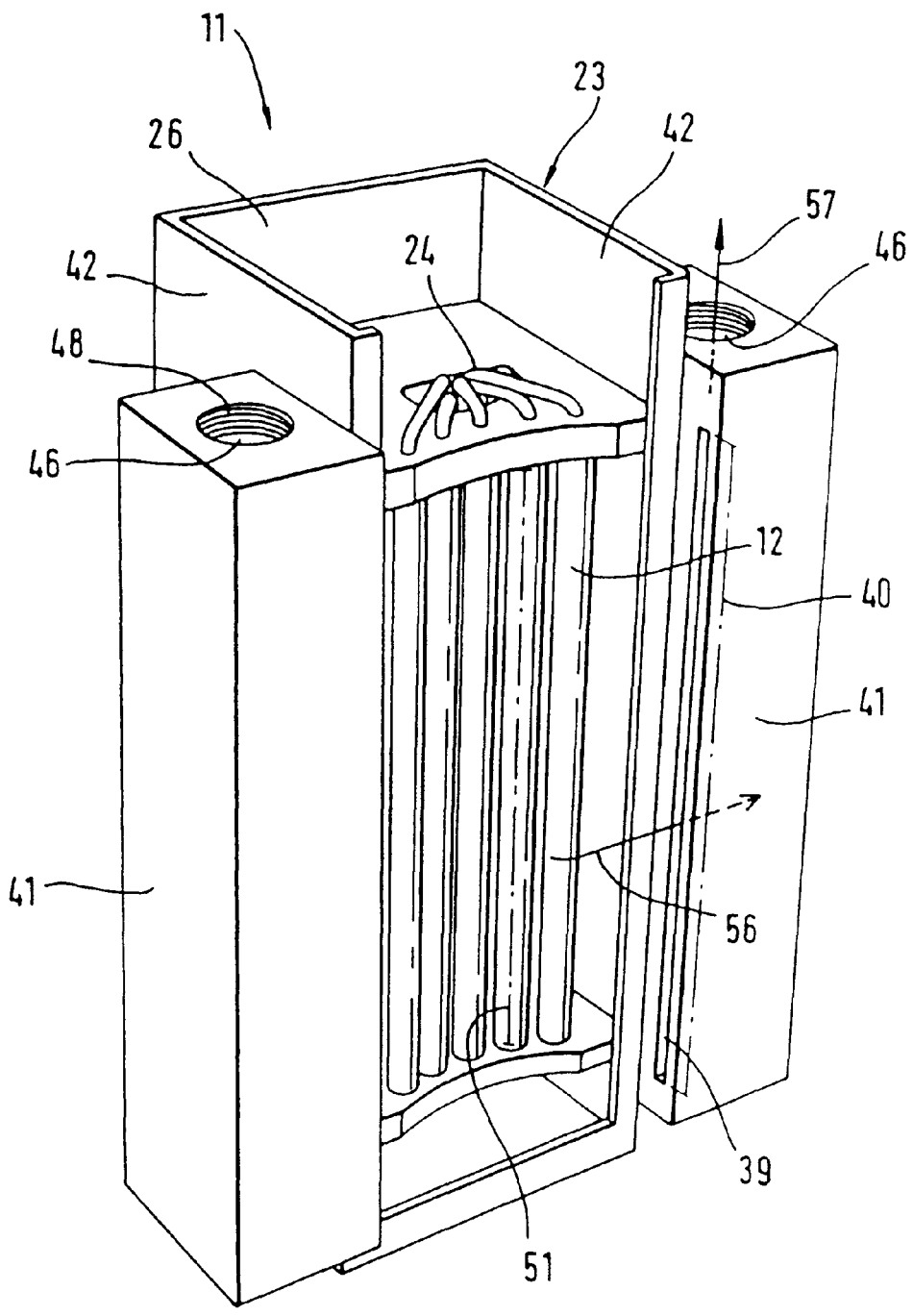
FIG. 1 shows a perspective view of an open apparatus (without counter-electrode, fastening device, cover and without deflecting means)

The electrodes 12 are essentially surrounded by a housing device 23, which is cuboidal and protects the electrodes 12 and their connecting means 24. The housing device 23 is open where the corona discharge occurs between electrodes 12 and counter-electrode 13. Since the counter-electrode 13 is roller-shaped, the five electrodes 12 are arranged on a circular arc whose centre coincides with the axis 14 of the counter-electrode 13.

Figure 2:
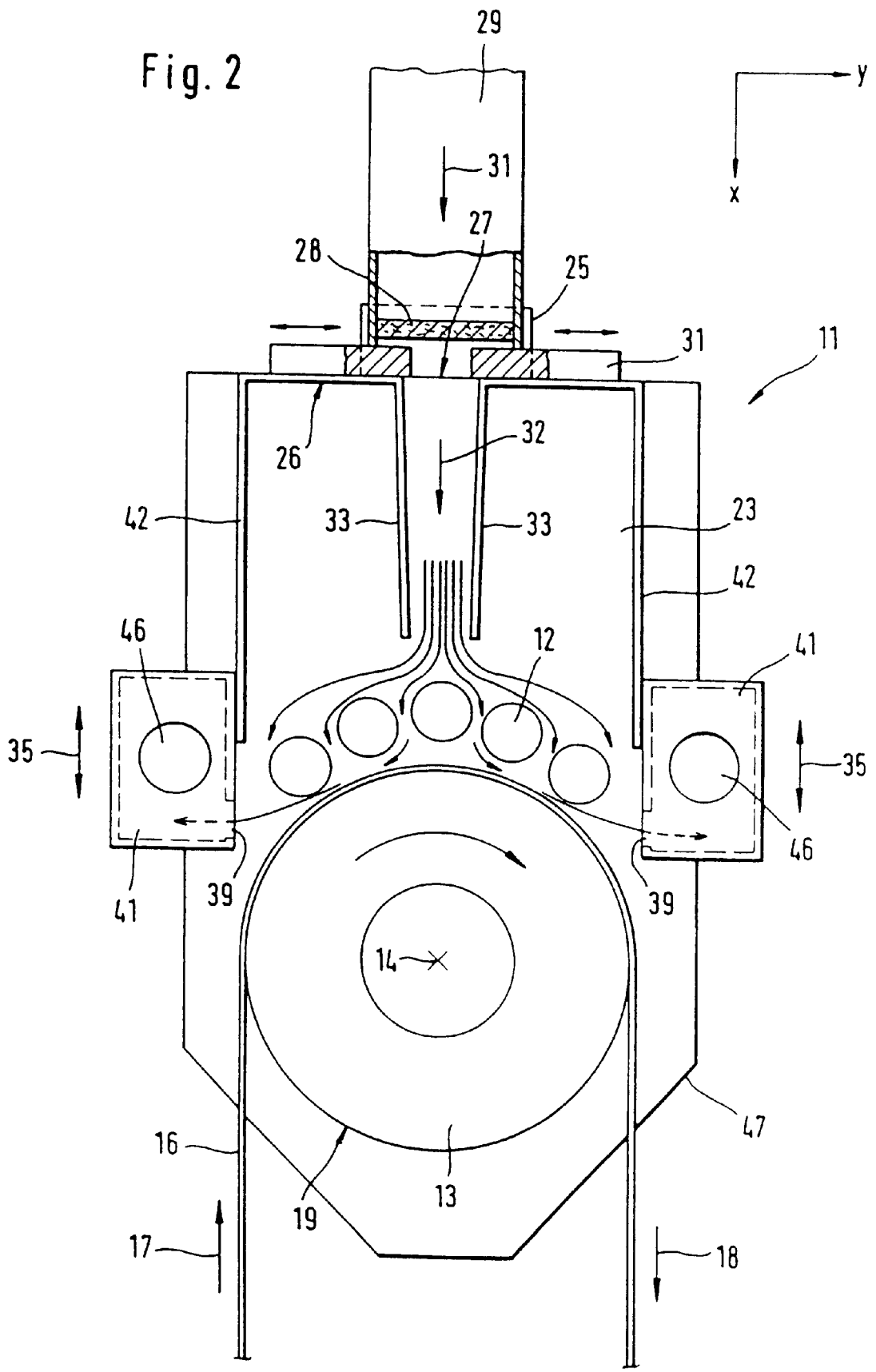
FIG. 2 shows the view in the xy-direction of the apparatus from FIG. 1 with counter-electrode and fastening device.

The connection 25 for the high-voltage supply and the feed opening 27 for fresh air or another gas or gas mixture are provided on the side 26 of the housing device 23 opposite the electrodes 12. In the view of FIG. 2, the connection 25 is situated downstream of the feed opening 27 and line 29.

Adjacent to the two walls 42 of the housing device 23 are two extraction units 41 having a gap 39 through which the air enters the extraction unit 41. With respect to its longitudinal axis 40, the gap 39 is aligned essentially parallel to the longitudinal axis 51 of the electrodes 12. It is also to be seen in FIG. 1 that the gap 39 is longer in the z direction than the length, likewise measured in the z direction, of the electrodes 12, effective extraction of ozone and dust being the result. Of course, the length of the gap 39 should correspond at least to the width of the substrate, so that the contaminants can be effectively extracted from the substrate.

The air flows through a line 29 via filter means 28 into the feed opening 27 of the housing device 23 (FIG. 2). In addition to the feed opening 27 of the housing device 23, means 31 are provided with the aid of which the size of the feed opening 27 can be adjusted. The means 31 can be displaced in the y direction.

In order to obtain cooling of all the electrodes 12, by the gas mixture, which is as uniform as possible, means 33 are provided in the housing device in the form of air baffles which prevent the air from flowing directly from the feed opening 27 to the gaps 39 of the extraction units without adequately cooling the electrodes 12.

In accordance with the arrow 32, the gas mixture flows in the direction (+x direction) of the electrodes 12. As soon as the deflecting means 33 no longer focus the flow, the flow widens out and flows past the or between the electrode(s). Consideration of the flow direction near an electrode (in the case of turbulent flow, possibly in the region of the laminar Prandtl boundary layer) shows that the flow at or near the electrodes has a directional component in the direction of the centre of the counter-electrode (+x direction). These directional components in the +x direction are represented in FIG. 3 for various flow vectors V (it was taken into account in the case of the flow vectors V illustrated that the co-ordinate system is to be aligned in each case in the direction of the centre 14 of the counter-electrode 19).

The gas mixture is extracted through the inlet openings 39 of the extraction units 41 arranged on both sides.

The extraction units 41 can be displaced in the x direction in accordance with arrow 35, with the result that the inlet openings 39 can be adjusted to optimum extraction.

Figure 3:
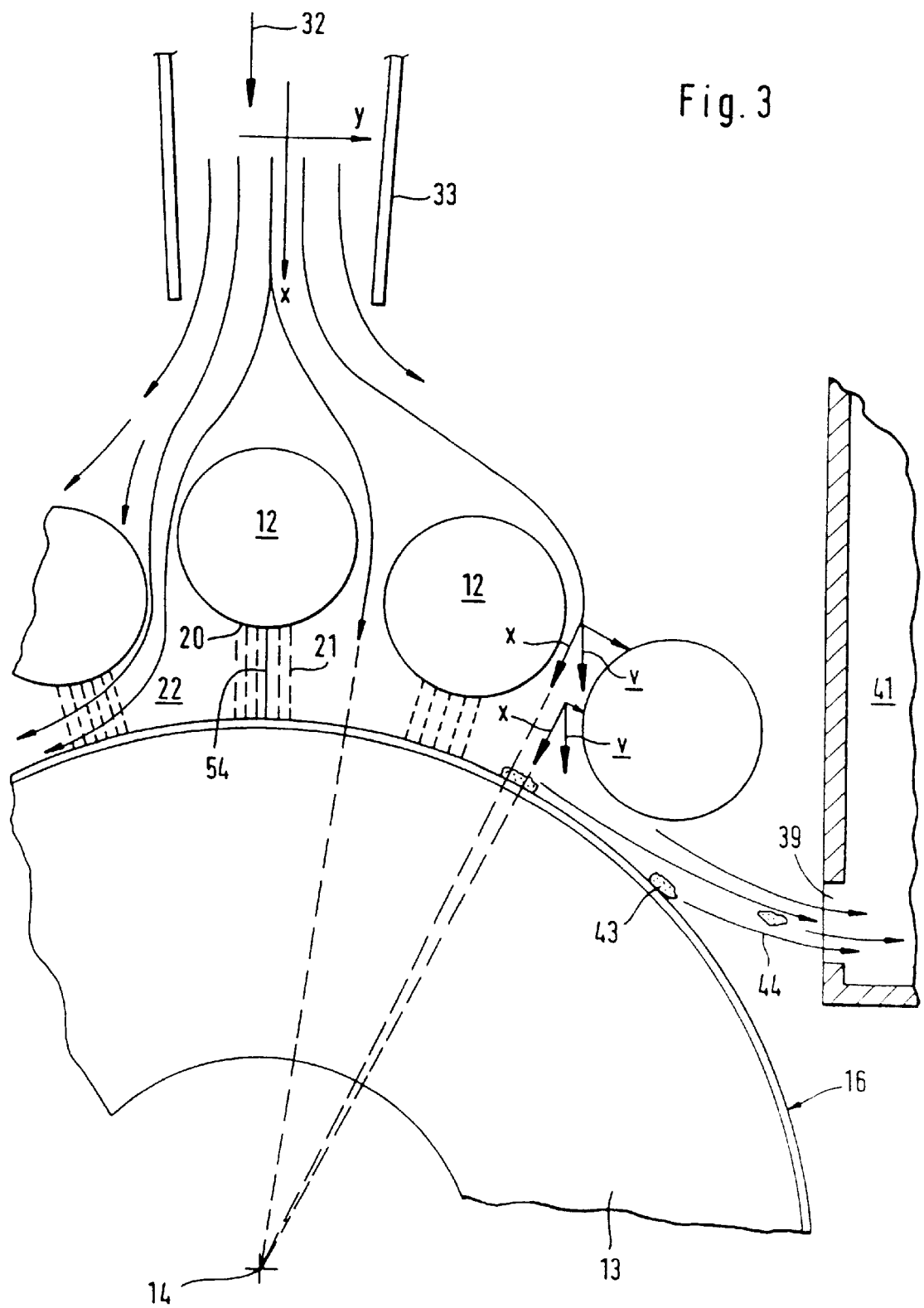
FIG. 3 shows an enlarged representation of the area of the electrode/counter-electrode inlet opening with flow vectors from FIG. 2.

As is also represented diagrammatically in FIG. 3, the dirt 43 located on the substrate 16 is also extracted by the suction of the extraction unit 41.

On their top sides, the extraction units 41 have outlet openings 46 which can be provided with a thread 48 and which lead outwards via lines, or else are fed to the tube 31 again via filter, adsorption, absorption and/or cooling means, with the result that a circuit is provided.

The flow direction 56 of the gas mixture when entering the gap 39 of the extraction unit 41, and the flow direction 57 when leaving the outlet opening 46 are essentially perpendicular to one another (FIG. 1). The result is effective extraction which is essentially constant through the length of the inlet gap 39.

Figure 4:
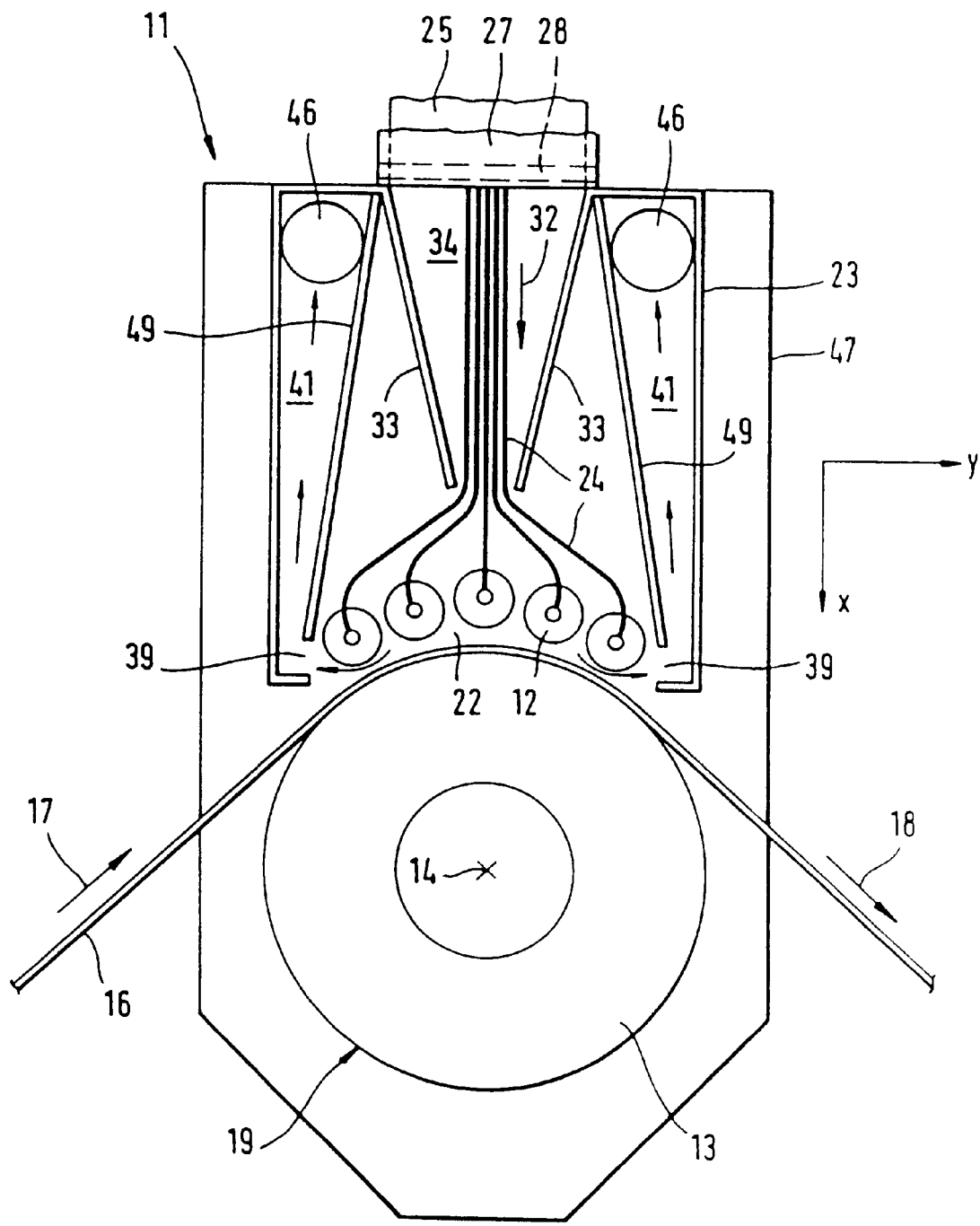
FIG. 4 shows the view of a second embodiment of the apparatus.

FIG. 4 shows, in turn, an apparatus having five electrodes 12, the cylindrical-shaped counter-electrode 13, the housing device 23 having the feed opening 27, and the filter means 28 which are arranged at the feed opening 27 through which the air is sucked into the interior of the housing device 23 in the region of the connecting means 24. The high-voltage connection 25 is located downstream of the filter means 28. The connecting means 24 are led from the individual electrodes 12 to the high-voltage connection 25 through the space 34 delimited by the deflecting means 33. The air (arrow 32) flowing into the space 34 through the filter means 28 flows through, in the way represented in FIGS. 2 and 3, between the electrodes 12 and along the latter. Instead of the flow direction known from FIGS. 2–3, the connecting means 24 of the electrodes 12 to the high-voltage connection 25 are represented in FIG. 4. In this exemplary embodiment, in turn, an extraction unit 41 is provided on both sides, but is integrated into the space of the housing device 23. The extraction units 41 are separated by means of walls 49 from the space of the housing device 23 in which the connecting means 24 of the electrodes 12 are located. To the side of the corona space 22, the two extraction units 41 have two inlet openings 39 through which the air is extracted, in the way already known, through the outlet opening 46 by the extraction unit 41. Again, the inlet direction of the air through the gap 39 into the extraction unit 41 is essentially perpendicular to the direction of the outlet of the air from the outlet opening 46. This embodiment is of more compact design than that represented in FIG. 1.

In principle, the apparatuses described have two devices 47 extending in the xy direction, which on the one hand cover the housing device 23, and on the other hand serve the purpose of fastening. These devices 47 are represented in FIGS. 2 and 4.

Of course, it is possible in the case of these devices to vary the spacing between the counter-electrode and the electrode or electrodes. This is advantageously achieved by virtue of the fact that the entire housing device with all the paths connected thereto, that is to say the housing device, electrodes with the connecting means and the extraction and feed units, can be displaced relative to the counter-electrode.

Of course, the apparatus can additionally be provided with deflecting rollers for the substrate, for example in order to make sure that the gap between the counter-electrode 13 and the inlet opening 39 of the extraction unit 41 is not so large that too much room air is sucked into the inlet openings 39 of the extraction unit 41, and also not too small.

What is claimed is:

1. Apparatus for processing flat substrates by means of a corona station, comprising:

a) at least one electrode which can be connected to a high-voltage supply via connecting means, b) a housing device which at least partly accommodates the electrode and its connecting means, c) at least one counter-electrode of cylindrical shaped construction, d) at least one device having at least one feed unit and two extraction units for producing a gas flow which essentially has a directional component for the counter-electrode, the flat substrate bearing against the counter-electrode and being deflected from a feed direction into a direction deviating from the feed direction and being led away, characterized in that in each case at least one extraction unit is provided on the inlet side of the substrate into a corona space formed between the electrode and counter-electrode, and on the outlet side of the substrate from the corona space, and in that the extraction units can be adjusted onto the path of the web of the substrate.

2. Apparatus according to claim 1, characterized in that the device produces in the housing device in the region of the connecting means a gas pressure which is higher than the gas pressure between electrode and counter-electrode.

3. Apparatus according to claim 1, characterized in that the stream flows essentially from the region of the connecting means of the electrode in the housing device in the direction of the electrode.

4. Apparatus according to claim 3, characterized in that at least one inlet opening of the extraction unit is essentially arranged to the side of the space in which the corona discharges occur.

5. Apparatus according to claim 4, characterized in that the inlet opening of the extraction unit is aligned essentially parallel to the longitudinal axis of the electrode.

6. Apparatus according to claim 4, characterized in that the length of the inlet opening corresponds at least to the length of the electrode and/or the width of the substrate.

7. Apparatus according to claim 4, characterized in that the direction of inlet of the gas mixture into the inlet opening of the extraction unit and the direction of outlet of the gas mixture from the outlet opening of the extraction unit are essentially perpendicular to one another.

8. Apparatus according to claim 4, characterized in that the size and/or location of the inlet opening is at least partly adjustable.

9. Apparatus according to claim 1, characterized in that two extraction units are provided which preferably are of identical mirror-image configuration.

10. Apparatus according to claim 1, characterized in that the housing device has a feed unit for gases, air or gas mixtures, which feed unit has an inlet opening leading into the housing device.

11. Apparatus according to claim 10, characterized in that the feed unit and/or the housing device has filter means.

12. Apparatus according to claim 10, characterized in that the size of the feed opening is adjustable.

13. Apparatus according to claim 10, characterized in that the feed unit comprises a device for producing a gas flow.

14. Apparatus according to claim 1, characterized in that means for directing the gas flow are provided in the housing device.

15. Apparatus according to claim 1, characterized in that means for directing the gas flow are provided in the extraction unit.

16. Apparatus according to claim 15, characterized in that the means for directing the gas flow are constructed as air-guiding baffles.

17. Apparatus according to claim 1, characterized in that the high voltage is at least 2 kV.

18. Apparatus according to claim 1, characterized in that the minimum electrode/counter-electrode spacing is at most 5 mm.

19. Apparatus according to claim 1, characterized in that the gas flow forms a circuit.

20. Apparatus according to claim 19, characterized in that filter means and/or a cooler are provided in the circuit.

21. Apparatus according to claim 1, characterized in that at least two electrodes and one counter-electrode are provided.

22. Apparatus according to claim 1, characterized in that the counter-electrode is rotatable.

23. Apparatus according to claim 1, characterized in that the counter-electrode is essentially level on the side facing the electrodes.

24. Apparatus according to claim 1, characterized in that ionizers and/or brushes and/or extraction and/or blowing units are additionally provided to form a combined corona/web-cleaning unit.

* * * * *